May 9, 1933.                J. L. CREVELING                1,908,012
                            ELECTRIC REGULATION
                        Original Filed Aug. 17, 1916
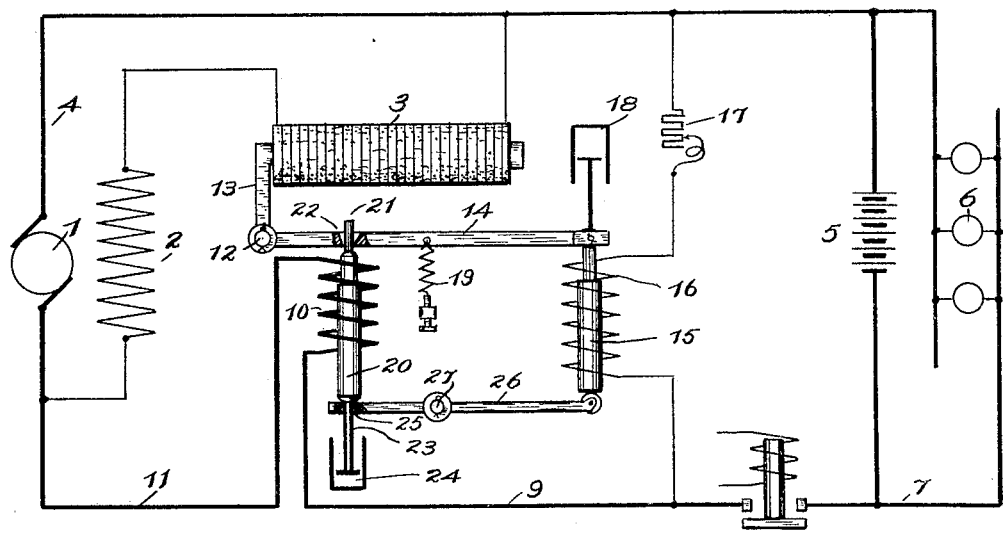
Fig. I.
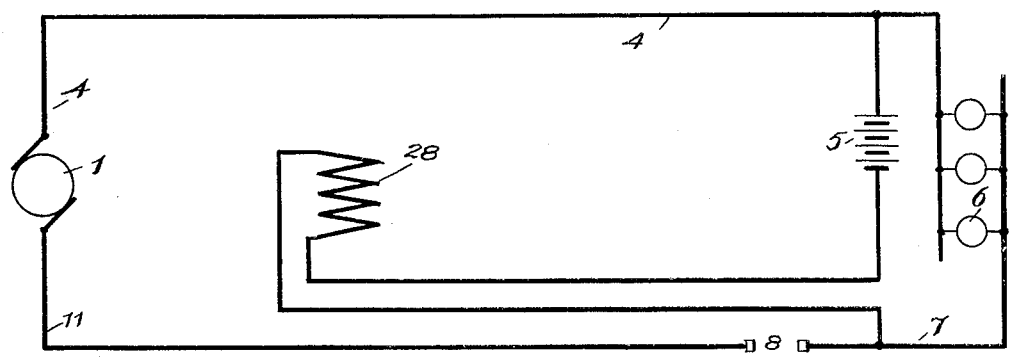
Fig. II.
INVENTOR Patented May 9, 1933

1,908,012

UNITED STATES PATENT OFFICE

JOHN L. CREVELING, OF WHITE PLAINS, NEW YORK, ASSIGNOR, BY MESNE ASSIGNMENTS, TO THE GOULD COUPLER COMPANY, A CORPORATION OF MARYLAND

ELECTRIC REGULATION

Application filed August 17, 1916, Serial No. 502,683. Renewed September 23, 1921.

My invention pertains to that class of electric regulation wherein it is desired to regulate a controllable source of electrical potential difference and has for a particular object to provide means whereby said source may be automatically regulated in a predetermined manner. A further object of my invention is to provide means whereby the current in a circuit supplied by said source may be held within predetermined limits and whereby the voltage across a circuit supplied by said source may also be held from exceeding predetermined limits. As such systems of regulation are particularly useful for regulating a dynamo operating to charge a storage battery and maintain lamps or other translating devices and more especially when the dynamo is driven at variable speeds causing its voltage and consequent current output to tend to widely vary, my invention will be described with particular reference to such a system.

In the drawing, Fig. I is a diagrammatic representation of one type of system embodying the essentials of my invention.

Fig. II shows a portion of a system similar to that of Fig. I in which a modification is shown without departing from my invention.

In the drawing, 1 represents a dynamo or generator provided with the usual field coil 2, having in series therewith a regulating device or element, in this instance indicated as a carbon pile 3, and it will be obvious that the dynamo may be regulated by regulating the pressure upon the carbon pile 3 in a well known manner. 4 represents the positive lead of the dynamo which is in electrical communication with the positive side of the storage battery 5 and the positive terminals of lamps or other translating devices indicated at 6. The negative terminals of the translating devices 6 and the battery 5 are in communication with the lead 7 carried to one side of any suitable automatic switch indicated at 8. This switch, the mere presence of which is indicated in the drawing for the sake of clearness, is preferably one of the automatic variety adapted to close its circuit when the generator voltage is substantially equal to or slightly in excess of that of the storage battery and to open the circuit when the generator voltage falls very slightly below that of the storage battery in such manner as to prevent back discharge from the battery through the generator.

The opposite terminal of the switch 8 is connected as by the lead 9 with one end of the series coil or solenoid 10, the opposite end of which is connected as by lead 11 with the negative brush of the generator 1. The pivot 12 carries a lever having a short arm 13 engaging one end of the carbon pile 3 and a long arm 14 carrying at its free extremity a core of magnetic material 15, surrounded by a voltage solenoid 16 in shunt across the generator as indicated and which may have its operation adjusted by means of the variable resistance 17. The coil 16 when energized tends to raise the core 15 and swing the lever 14 in a counter-clockwise direction against the action of the dashpot arrangement indicated at 18 and the adjustable spring indicated at 19. 20 is a core of iron or other magnetic material within the solenoid 10 which when energized tends to raise the same. The core 20 is provided at its upper extremity with a guide rod of non-magnetic material 21 which passes freely through an opening 22 in the lever 14. The core 20 is provided at its lower extremity with a guide rod of non-magnetic material 23 which may serve as the stem of the dashpot arrangement indicated at 24 and which passes freely through an opening 25 in the lever 26, pivoted as at 27, and adapted when revolved in a counter-clockwise direction by the weight of the core 20 to press upwardly upon the end of the core 15 so as to tend to lessen the effect of gravity upon the lever 14.

In Fig. II like numerals are used to indicate like parts. A coil 28 is shown in the battery circuit and if in the system of Fig. I the coil 10 be suppressed and the coil 28 of Fig. II substituted in its stead, the core 20 will be affected by the current in the battery circuit only instead of the total generator output.

An operation of my invention is substantially as follows:

If the dynamo be at rest or running at sufficiently low speed, the switch 8 will be open and the translating devices 6 may be maintained by the battery 5 in a well known manner. If the generator have its voltage raised until in excess of that of the battery, the switch 8 will close and current will flow from the generator 1 through lead 4, battery 5 and translating devices 6, lead 7, switch 8, lead 9, coil 10 and lead 11 to the generator. Current will also flow through coil 16 which is shown in shunt across the generator. This current will tend to raise the core 15 and lever 14 against the action of adjustable spring 19 and dashpot 18 in such manner as to decrease the pressure upon the pile 3. And I so adjust the spring 19 and resistance 17 that when the generator voltage reaches a predetermined value which it is desired shall not be exceeded, further rise in voltage will be avoided by the coil 16 lifting the core 15 and swinging the lever 14 smoothly against the action of dashpot 18 so as to decrease the pressure upon the pile 3 and cut down the field excitation to prevent this maximum voltage from being exceeded. By using a comparatively long pull solenoid of fairly liberal dimensions and a long lever 14, I may cause the voltage to be held constant within quite narrow limits throughout a wide tendency of the generator to exceed the maximum voltage. If the generator, at or below this maximum voltage, tends to deliver a current above a predetermined maximum, such, for example, as might be dangerous with respect to the generator or the battery, as is often the case when the battery is in a low state of charge, this high current value in the coil 10 will cause the same to draw the core 20 upwardly into contact with the lever 14 and then further appreciable rise of current will be prevented by the coil 10 raising the lever 14 so as to relieve the pressure upon the pile 3 in a well known manner. As the core 20 is raised and its weight removed from one extremity of the lever 26, the other extremity will withdraw part of its assistance from the core 15 and slightly increase the current necessary in the coil 16 in order that the same might perform the entire function of regulation, the major portion of which is now usurped by the current regulating coil 10 and its cooperating mechanism. If now under current control, as above outlined, the generator continues to charge the storage battery until its voltage rises to such a point that it will require more than the maximum voltage desired upon the system to cause the generator to deliver this maximum desired output, then coil 16 will usurp the major function of regulating the generator, and if the battery voltage rises more, the current in the coil 10 will fall off. As this current falls off, coil 10 will allow the core 20 to descend and rest upon one end of the lever 26 and, by pressing upwardly through the opposite end of said lever upon the bottom of core 15, it will tend to assist the same and cause a slightly lower voltage across the coil 16 to be capable of performing the entire regulation of the generator. Therefore, the generator voltage will be held at a slightly lower standard as the generator output tends to fall, upon operation of the voltage regulator. This will produce a very desirable effect, for, if the battery be in a low state of charge to start with, a comparatively low voltage, below that necessary to cause the voltage regulating means alone to affect the generator field, will cause the maximum current to be delivered and the generator will be regulated in response to current fluctuations in the coil 10. Then if this be continued until the battery voltage is brought up until it reaches the maximum desired to have impressed across the battery, as for example substantially its fully charged voltage, coil 16 will usurp the function of regulating the generator and the current in coil 10 will fall off and core 20, by resting upon the lever 26, will render the voltage responsive means capable of performing the entire function of regulation even at a little lower voltage than that necessary to cause it to usurp the regulation. Therefore, as the battery voltage tends to cause the current output to fall off by causing the voltage regulator to come into play, the current regulator will upon the falling off in current assist the voltage regulator in such manner that the current will now fall off the more rapidly and prevent a long continued, slow tapering charge to the battery and bring about an abrupt taper or substantial diminution in current or in effect cut off the supply of current to the battery when the same becomes charged. This effect is, of course, somewhat more pronounced in that modification shown in Fig. II wherein the coil operating the current responsive means is in series with the battery circuit and affected by the battery current only, for then a falling off in battery charging current, due to the rise in battery voltage, will cause a lowering of the standard voltage upon the system even though the total generator output may remain near the maximum, due to external load. While the structure here shown discloses a voltage regulator and a means for adjusting its standard of operation which so operates only at such times as the current output of the generator is below a predetermined value, this broad feature is not here claimed as the same is covered in my co-pending application 383,750, filed May 24, 1920, now Patent No. 1,900,278.

I do not wish in any way to limit myself to any of the exact details of construction or modes of operation set forth above merely to portray an embodiment of my invention for it is obvious that wide departure both in construction and in operation may be made without departing from the spirit and scope of my invention which is as set forth in the following claims.

I claim:

1. Regulating means comprehending current responsive means, voltage responsive means, and means operated thereby and affected in the same direction by opposed joint effects on the responsive means.

2. Regulating means comprehending current responsive means, voltage responsive means, and means operated thereby and affected in the same direction by opposite joint effects of the responsive means depending upon the degree of activity of the responsive means.

3. Regulating means comprehending affecting means responsive to certain fluctuations, affecting means responsive to other fluctuations, and means whereby the affecting means cooperate upon fluctuations producing reverse effects therein respectively.

4. Regulating means comprehending a plurality of responsive means each arranged to perform a regulating function and one of which is also adapted to cooperate with the other to cause said other to operate when said one is otherwise ineffective.

5. The combination with a regulating device, of a plurality of automatic means each affecting the same, one of said means being also capable of cooperating with the other when ineffective to affect the regulating device as first mentioned.

6. The combination with regulating apparatus a plurality of responsive means and means whereby the regulating apparatus is affected by said means, of means whereby said responsive means may cooperate to affect the regulating apparatus when one thereof is otherwise ineffective to affect the same.

7. The combination with regulating apparatus, of responsive means for operating the same, a second responsive means adapted to directly affect the regulating apparatus under certain conditions and to indirectly affect the same by cooperating with the other responsive means under other conditions.

8. Regulating means comprehending a regulating element and responsive means for affecting the same, of another responsive means capable when operating in one direction of affecting the regulating element and when operating in the opposite direction of also affecting said element in the same direction as before.

9. The combination with a regulating element, of a plurality of responsive means for affecting the same, one of said responsive means operating in two directions to affect the regulating means in a single direction.

10. The combination with a dynamo and means for controlling the same, of operating means for the controlling means and a second operating means affecting the controlling means in the same sense upon increase and decrease in the activity thereof.

11. The combination with a generator, of means for regulating the same to hold the voltage from exceeding a predetermined limit, means for operating the same to prevent the current from exceeding a predetermined limit and means whereby the current responsive means alters the standard of the voltage responsive means upon diminution of current.

12. Regulating means comprehending a plurality of responsive means, means whereby each performs a regulating function, and means whereby one of the responsive means may cooperate with the other to affect the regulating means when otherwise ineffective to affect the regulating means.

13. Regulating means comprehending a plurality of responsive means for operating the same and means whereby one responsive means may cooperate with another responsive means effective only when the quantity to which said one means is responsive is below a certain value.

14. The combination with a generator, of means for regulating the same comprehending a regulating element, means for affecting the element in response to voltage fluctuations, means for affecting the element in response to current fluctuations, and means whereby the current fluctuations modify the standard of the voltage operated means when said current fluctuations are below a certain value only.

15. The combination with a variable speed generator, a regulating element for controlling the same, a voltage responsive coil across said generator for operating said element, and current responsive means for operating said element of means affected by the current responsive means for adjusting the standard of operation of said coil thus operating only while the output of the generator is below a predetermined value.

16. The combination with a variable speed generator, a storage battery charged thereby, a voltage responsive regulator for the generator controlling the voltage impressed thereby upon the storage battery and current responsive means for operating said regulator, of means for adjusting the voltage held upon the battery by said regulator operated by said current responsive means to perform such adjustment only when the output of the generator is below a predetermined value.

17. The combination with a variable speed generator, a storage battery supplied thereby and a voltage operated regulator for controlling the generator by limiting the voltage impressed across the battery thereby, of a current responsive device for operating said regulator and means whereby the same alters the standard of voltage maintained across the battery by said voltage regulator only when the current output of the generator is below a predetermined value.

18. The combination with a variable speed generator, a storage battery charged thereby and a voltage responsive regulator controlling the voltage impressed upon said battery, of a device for adjusting the standard of operation of said voltage regulator producing the maximum effect thereupon during the minimum output of said generator.

19. The combination with a variable speed dynamo and a storage battery charged thereby, of automatic means adapted to hold the voltage of said generator substantially constant in spite of speed changes and responsive means for adjusting the operation of said automatic means producing its greatest change in effect thereupon when the current output of the generator to the battery is nil.

20. The combination with a variable speed generator, a regulating element for controlling the same, a voltage responsive coil across said generator for operating said element and current responsive means for operating said element, of means for controlling the standard of voltage required to cause said coil to operate said element affected by said current responsive means and thus operating only while the output of the generator is below a predetermined standard.

21. The combination with a variable speed generator, a storage battery charged thereby, a voltage responsive regulator for the generator controlling the voltage impressed thereby upon the storage battery current responsive means affected by generator current for operating said regulator and a means for adjusting the voltage to be held upon the battery by said regulator affected by the current responsive means and operating to perform such adjustments only when the activity of the generator is below a predetermined value.

22. Regulating means comprehending a plurality of responsive means each arranged to perform a regulating function in response to fluctuations above a certain value, and means whereby one of said responsive means may cooperate with the other upon fluctuations below that value necessary to cause the same to otherwise affect the regulating means.

23. The combination with a generator, means for regulating the same comprehending a regulating element, a plurality of automatic means for affecting said element affected by the operation of the generator and responding to different factors of generator activity when said factors tend to exceed predetermined values, of means whereby one of said responsive means affects the operation of the other when the factor to which said one is responsive is below the aforesaid operating value only.

24. Regulating means comprehending a plurality of responsive means each capable of performing a regulating function and one of which is also capable of cooperating with another to perform a regulating function when ineffective to perform the first-named regulating function.

25. An electric regulator comprehending a plurality of responsive means, means whereby they each perform a regulating function under certain conditions and independent means whereby they cooperate under other conditions.

26. The combination with a regulating device, of a plurality of automatic means each of which affects the same under certain conditions and means whereby one of which cooperates with the other under conditions differing from those first-mentioned.

27. The combination with regulating apparatus, of responsive means for operating the same, a second responsive means adapted to usurp control of the regulating apparatus under certain conditions and to affect the same by cooperating with the other responsive means under other conditions.

28. The combination with a generator, a storage battery charged thereby and a regulator tending to hold the generator voltage constant as against speed changes, of current responsive means acting to affect the regulator when the generator current tends to exceed a predetermined limit, to affect the regulator when the current from the generator falls below a certain limit, and to remain ineffective between the said limits.

29. The combination with a generator, a storage battery charged thereby and a regulator tending to hold the generator voltage constant as against speed changes, of current responsive means acting to affect the regulator when the current to the battery tends to exceed a certain limit, to affect the regulator when the current to the battery falls below a certain limit, and to remain ineffective between the said limits.

30. The combination with a generator, a battery charged thereby and a regulator tending to hold the generator voltage constant as against speed changes, of current responsive means acting to affect the regulator when the current therethrough tends to exceed a certain limit and to affect the regulator when said current falls below a predetermined limit.

JOHN L. CREVELING.

CERTIFICATE OF CORRECTION.

Patent No. 1,908,012. May 9, 1933.

JOHN L. CREVELING.

It is hereby certified that error appears in the printed specification of the above numbered patent requiring correction as follows: Page 3, line 11, claim 1, for the word "on" read of; and that the said Letters Patent should be read with this correction therein that the same may conform to the record of the case in the Patent Office.

Signed and sealed this 18th day of January, A. D. 1938.

(Seal)

Henry Van Arsdale,
Acting Commissioner of Patents.